(12) United States Patent
Limsopatham et al.

(10) Patent No.: US 11,934,937 B2
(45) Date of Patent: Mar. 19, 2024

(54) SYSTEM AND METHOD FOR DETECTING THE OCCURRENCE OF AN EVENT AND DETERMINING A RESPONSE TO THE EVENT

(71) Applicant: Accenture Global Solutions Limited, Dublin (IE)

(72) Inventors: Nut Limsopatham, Dublin (IE); Md Faisal Zaman, Dublin (IE); Freddy Lecue, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 1157 days.

(21) Appl. No.: 15/645,757

(22) Filed: Jul. 10, 2017

(65) Prior Publication Data
US 2019/0012591 A1    Jan. 10, 2019

(51) Int. Cl.
*G06N 3/042*    (2023.01)
*G06F 13/378*    (2006.01)
(Continued)

(52) U.S. Cl.
CPC ........... *G06N 3/042* (2023.01); *G06F 13/378* (2013.01); *G06N 3/044* (2023.01); *G06N 3/08* (2013.01); *G06N 5/022* (2013.01)

(58) Field of Classification Search
CPC ...... G06N 3/0427; G06N 3/0445; G06N 3/08; G06N 5/022; G06F 13/378
See application file for complete search history.

(56) References Cited

U.S. PATENT DOCUMENTS 6,173,284 B1    1/2001    Brown
6,704,874 B1    3/2004    Porras
(Continued)

FOREIGN PATENT DOCUMENTS

EP    2 051 468    10/2012
EP    2770688    8/2014
(Continued)

OTHER PUBLICATIONS

Violante, João Carlos Duarte Santos Oliveira. "Sentiment Analysis with Deep Neural Networks." (2016). (Year: 2016).*
(Continued)

*Primary Examiner* — Oluwatosin O Alabi
(74) *Attorney, Agent, or Firm* — Crowell & Moring LLP

(57) ABSTRACT

A system for predicting the occurrence of an event includes an event detector and a reporting processor. The event detector is configured to: receive data that defines a plurality of social media items; receive a real-time data feed; and predict the occurrence of an event based on a correlation between information in the plurality of social media items and activity associated with the real-time data feed. The reporting processor is configured to determine an event type associated with the event; identify a sentiment of the predicted event based on historical data in the real-time data feed, and generate a recommendation for preventing the occurrence of the event based on at least one of the event type and the sentiment of the predicted event. The recommendation includes a plurality of actions. The reporting processor is coupled to a knowledge graph database that corresponds to an ontology that defines one or more relationships between event types, and response types. The reporting processor determines an order of the actions of the recommendation based on the knowledge graph ontology.

16 Claims, 7 Drawing Sheets

(51) Int. Cl.
*G06N 3/044* (2023.01)
*G06N 3/08* (2023.01)
*G06N 5/022* (2023.01)

(56) References Cited

U.S. PATENT DOCUMENTS

| | | | |
|---|---|---|---|
| 7,203,693 | B2 | 4/2007 | Carlbom et al. |
| 7,523,137 | B2 | 4/2009 | Kass et al. |
| 8,024,795 | B2 | 9/2011 | Newton |
| 8,463,790 | B1 | 6/2013 | Joshi |
| 8,504,879 | B2 | 8/2013 | Poletto et al. |
| 8,516,104 | B1 | 8/2013 | Liu et al. |
| 8,538,911 | B2 | 9/2013 | Kass et al. |
| 8,775,429 | B2 * | 7/2014 | Choudhary ............ G06Q 50/01 707/738 |
| 8,966,639 | B1 | 2/2015 | Roytman et al. |
| 8,984,643 | B1 | 3/2015 | Krisher et al. |
| 9,118,617 | B1 | 8/2015 | Giroux |
| 9,407,645 | B2 | 8/2016 | Modi et al. |
| 9,503,467 | B2 | 11/2016 | Lefebvre et al. |
| 9,716,721 | B2 | 7/2017 | Hovor et al. |
| 9,892,168 | B1 * | 2/2018 | Apreleva ............... G06N 20/00 |
| 2002/0078381 | A1 | 6/2002 | Farley |
| 2003/0033318 | A1 | 2/2003 | Carlbom et al. |
| 2003/0093514 | A1 | 5/2003 | Valdes et al. |
| 2003/0182310 | A1 | 9/2003 | Charnock et al. |
| 2004/0024738 | A1 | 2/2004 | Yamane |
| 2005/0071445 | A1 | 3/2005 | Siorek |
| 2005/0114493 | A1 | 5/2005 | Mandato et al. |
| 2005/0138413 | A1 | 6/2005 | Lippmann et al. |
| 2005/0185823 | A1 | 8/2005 | Brown et al. |
| 2006/0230071 | A1 | 10/2006 | Kass et al. |
| 2007/0067848 | A1 | 3/2007 | Gustave et al. |
| 2008/0005796 | A1 | 1/2008 | Godwood |
| 2008/0109730 | A1 | 5/2008 | Coffman et al. |
| 2008/0295172 | A1 | 11/2008 | Bohacek |
| 2008/0307525 | A1 | 12/2008 | Nickle |
| 2009/0219154 | A1 | 9/2009 | Kukula |
| 2010/0071061 | A1 | 3/2010 | Crovella et al. |
| 2010/0180344 | A1 | 7/2010 | Malyshev |
| 2010/0223499 | A1 | 9/2010 | Panigrahy |
| 2011/0185421 | A1 | 7/2011 | Wittenstein |
| 2011/0185422 | A1 | 7/2011 | Khayam |
| 2012/0096549 | A1 | 4/2012 | Amini et al. |
| 2012/0123822 | A1 | 5/2012 | Hnatio |
| 2012/0173710 | A1 | 7/2012 | Rodriguez |
| 2012/0246054 | A1 * | 9/2012 | Sastri .................... G06Q 10/04 705/37 |
| 2012/0254088 | A9 | 10/2012 | Kass et al. |
| 2013/0019008 | A1 | 1/2013 | Jorgenson |
| 2013/0239177 | A1 | 9/2013 | Sigurdson et al. |
| 2013/0339341 | A1 | 12/2013 | Fan |
| 2014/0040371 | A1 * | 2/2014 | Gurevich ............ G06F 16/9537 709/204 |
| 2014/0157405 | A1 | 6/2014 | Joll |
| 2014/0189873 | A1 | 7/2014 | Elder et al. |
| 2015/0341379 | A1 | 11/2015 | Lefebvre et al. |
| 2016/0065598 | A1 | 3/2016 | Modi et al. |
| 2016/0261640 | A1 | 9/2016 | Modi et al. |
| 2016/0352768 | A1 | 12/2016 | Lefebvre et al. |
| 2017/0083817 | A1 * | 3/2017 | Di Sciullo ............. G06N 5/022 |
| 2017/0206557 | A1 * | 7/2017 | Abrol .................... G06Q 50/01 |
| 2017/0220578 | A1 * | 8/2017 | Kazi ...................... G06F 40/30 |
| 2017/0308986 | A1 * | 10/2017 | Simpson ................ G06F 40/30 |
| 2018/0101779 | A1 * | 4/2018 | Canim ................... G06N 5/046 |
| 2018/0247189 | A1 * | 8/2018 | Adel .................. G06Q 30/0269 |
| 2018/0288455 | A1 * | 10/2018 | Baughman ....... H04N 21/44213 |

FOREIGN PATENT DOCUMENTS

| | | |
|---|---|---|
| JP | 06250911 | 9/1994 |
| WO | WO 2005/107414 | 11/2005 |
| WO | WO 2005/111805 | 11/2005 |
| WO | WO 2011/095988 | 8/2011 |
| WO | WO 2013/014672 | 1/2013 |
| WO | WO 2013/109374 | 7/2013 |

OTHER PUBLICATIONS

Ó Séaghdha, D., & Korhonen, A. (2014). Probabilistic distributional semantics with latent variable models. Computational Linguistics, 40(3), 587-631. (Year: 2014).*
Wu D, Chi M. Long short-term memory with quadratic connections in recursive neural networks for representing compositional semantics. IEEE Access. Jan. 2, 2017;5:16077-83. (Year: 2017).*
Peng YX, Zhu WW, Zhao Y, Xu CS, Huang QM, Lu HQ, Zheng QH, Huang TJ, Gao W. Cross-media analysis and reasoning: advances and directions. Frontiers of Information Technology & Electronic Engineering. Jan. 2017;18(1):44-57. (Year: 2017).*
Jurek A, Bi Y, Mulvenna M. Twitter sentiment analysis for security-related information gathering. In2014 IEEE Joint Intelligence and Security Informatics Conference Sep. 24, 2014 (pp. 48-55). IEEE. (Year: 2014).*
Bendler, Johannes, Tobias Brandt, Sebastian Wagner, and Dirk Neumann. "Investigating crime-to-twitter relationships in urban environments-facilitating a virtual neighborhood watch." (2014). (Year: 2014).*
Perek F. Using distributional semantics to study syntactic productivity in diachrony: A case study. Linguistics. Jan. 1, 2016;54(1):149-88. (Year: 2016).*
Resnyansky L. Social media, disaster studies, and human communication. IEEE Technology and Society Magazine. Mar. 11, 2014;33(1):54-65. (Year: 2014).*
Gu Y, Qian ZS, Chen F. From Twitter to detector: Real-time traffic incident detection using social media data. Transportation research part C: emerging technologies. Jun. 1, 2016;67:321-42. (Year: 2016).*
Mazumdar S, Lanfranchi V, Ireson N, Ciravegna F. Visual Analysis of Real-time Social Media for Emergency Response. InSSA-SMILE@ ESWC May 25, 2014 (pp. 67-78). (Year: 2014).*
"Common Vulnerability Scoring System (CVSS)" wikipedia.org [online] retrieved on Jul. 15, 2015. Retrieved from the Internet: <URL: https://en.wikipedia.org/wiki/CVSS>, 8 pages.
"Common Vulnerability Scoring System v3.0: Specification Document," first.org [online]. Jun. 12, 2015 [retrieved on Jul. 15, 2015]. Retrieved from the Internet: <URL: https://www.first.org/cvss/cvss-v30-specification-v1.4.pdf>, 19 pages.
"Protect Your PEO," crowdstrike.com [online] retrieved on Jul. 15, 2015. Retrieved from the Internet: <URL: http://www.crowdstrike.com>, 2 pages.
Extended European Search Report in Application No. 15168872.8, dated Oct. 20, 2015, 6 pages.
Office action in AU Application No. 2015202706, dated Oct. 30, 2015, 3 pages.
U.S. Non-Final Office Action for U.S. Appl. No. 14/285,487 dated Oct. 7, 2015, 22 pages.
U.S. Non-Final Office Action for U.S. Appl. No. 14/473,730 dated Aug. 23, 2015, 29 pages.
Polepeddi, "Software Vulnerability Taxonomy Consolidation," Thesis, Jan. 5, 2005, 43 pages. Retreived from the Internet: URL: http://www.osti.gov/bridge/product.biblio.jsp?osti.sub.--id=15020074 [retrieved on Nov. 2, 2007].
Extended European Search Report in Application No. 15181400.1 dated Jan. 27, 2016, 7 pages.
Office action in AU Application No. 2015202706, dated Mar. 8, 2016, 2 pages.
Srinivasan et al, "A self-organized agent-based architecture for power-aware intrusion detection in wireless ad-hoc networks," Computing & Informatics, IEEE 2006, 6 pages.
Office Action in AU Application No. 2015213316, dated May 6, 2016, 3 pages.
Office Action in AU Application No. 2015213391, dated May 15, 2016, 3 pages.
Canadian first Examiner's Report for Application No. 2,602,564 dated Mar. 1, 2013, 2 pages.

(56) References Cited

OTHER PUBLICATIONS

European Patent Office dated Dec. 18, 2007 for co-pending European Patent Office Application No. 07253957.0, 8 pages.
European Patent Office dated Feb. 4, 2008 for co-pending European Patent Office Application No. 06 742 600.7, 3 pages.
PCT International Preliminary Report on Patentability for Application No. PCT/EP2006/003533 dated Oct. 18, 2007, 13 pages.
International Search Report and the Written Opinion for International Application No. PCT/EP2006/003533 dated Sep. 8, 2006, 15 pages.
U.S. Final Office Action for U.S. Appl. No. 11/387,173 dated Aug. 14, 2008, 16 pages.
U.S. Final Office Action for U.S. Appl. No. 12/405,026 dated Dec. 12, 2011, 21 pages.
U.S. Non-Final Office Action for U.S. Appl. No. 11/387,173 dated Feb. 22, 2008, 16 pages.
U.S. Non-Final Office Action for U.S. Appl. No. 12/405,026 dated May 4, 2011, 19 pages.
U.S. Notice of Allowance for U.S. Appl. No. 11/387, 173 dated Dec. 12, 2008, 19 pages.
U.S. Notice of Allowance for U.S. Appl. No. 12/405,026 dated Apr. 25, 2012, 13 pages.
U.S. Notice of Allowance for U.S. Appl. No. 12/405,026 dated Jun. 12, 2013, 21 pages.
"KBMS-Prototype KRISYS usermanual overview" KBMS-Prototype KRISYS User Manual, Dec. 1992 (Dec. 1992), p. 1-94, XP002193794.
Accenture, Technology Labs, Discover What Your Customers Really Think, 2pp., Accenture 2005.
Allan et al.: "Taking Topic Detection From Evaluation to Practice" Proceedings of the 38th International Conference on System Sciences, Jan. 3, 2005 (Jan. 3, 2005), 10 pages, XP010762602.
Birnbaum et al., "Analogy, Intelligent IR, and Knowledge Integration for Intelligence Analysis" Ai Technologies for Homeland Security, Papers From the 2005 Aaai Spring Symposium, Mar. 21, 2005 (Mar. 21, 2005) XP002390865 Menlo Park, CA Retrieved from the Internet: URL:http://www.infolab.northwestern.edu/infolab/downloads/papers/paper101-42.pdf> [retrieved on Jul. 19, 2006], 6 pages.
Bloglines, Create a Personal Bloglines Page Loaded with the Freshest News About the Things You Love, 1p., 2003.
Chung and Mcleod: "Dynamic Topic Mining from News stream Data" COOPIS/DOA/ODBASE 2003, [Online] 2003, pp. 653-670, XP002391208 Retrieved from the Internet: URL:http://www.springerlink.com/(zb2dxr55xljuq5453e2bnj-55)/app/home/contribution.asp?referrer=parent&backto=issue,42,95;journal,1-127,3908;linkingpublicationresults,1:10 5633,1> [retrieved on Jul. 19, 2006].
ClearforestText-Driven Business Intelligence, ClearForest Tagging & Extraction Platform, 2pp., 2006.
Genalytics Auto, List Management Solution, Genalytics, Auto: List Management Solution for Driving Successful Campaigns, 2pp., Genalytics, Inc., 2006.
Genalytics Data Sheet, Genalytics, Genalytics Knowledge Extract: Extract Meaning from Your Uninstructed, Data, 2pp., Genalytics, Inc. 2004.
Genalytics DB Extract, Advanced Data Extraction, Genalytics DB Extract: Advanced Data Extraction, Transformation and Scoring for Enterprise Data, Genalytics, Inc. 2006, 2 pages.
Genalytics Model, Leverage More Data, Create Better Models, 2pp., Genalytics, Inc., 2006.
Genalytics Prospect, Automated Analytics and Targeted Analytics and Targeted Lists, 2pp., Genalytics, Inc., 2006.
http://genalytics.com, Building Next Generation Predictive Models Using Genetic Algorithm-based Software, 14pp Genalytics, Inc. 2003.
Intelliseek, Brandpulse Products, BrandPulse 360.TM., 2pp. 1997-2006.
Intelliseek, Brandpulse Products, BrandPulse CRM.TM., 2pp., 1997-2006.
Intelliseek, Brandpulse Products, BrandPulse Internet. TM., 2pp., 1997-2006.
Intelliseek, Brandpulse Products, BrandPulse.TM. Direct, 2pp., 1997-2006.
Intelliseek, Brandpulse Products, BrandPulse.TM. Overview, 2pp., 1997-2006.
Inxight ThingFInder.RTM. Advanced, Inxight ThingFinder Advanced with Custom Entity Extraction, ThingFinder Advanced Delivers New Extensibility for Inxight Extraction Solutions, 1p., 2006.
Inxight, Inxight SmartDiscovery.RTM. Analysis Adapters and Connectors, 2pp., Inxight Software Inc., 2005.
Liu Hugo et al: "ConceptNet—a practical commonsense reasoning tool-kit" Bt Technol J; Bt Technology Journal Oct. 2004, [Online] vol. 22, No. 4, Oct. 2004 (Oct. 2004), pp. 211-226, XP002391209. Retrieved from the Internet: URL:http://web.media.mit.edu/{push/Concept Net-BTTJ.pdf>[retrieved on Jul. 19, 2006].
Makkonen: "Investigations on Event Evolution in TDT" Citeseer, [Online] 2003, XP002391206. Retrieved From the Internet: URL:Http://Citeseer.Ist.Pst.Edu/706354.Htm 1>[Retrieved on Jul. 19, 2006], 6 pages.
McCallum, Bow: A Toolkit for Statistical Language Modeling, Text Retrieval Classification and Clustering, 2pp., Sep. 12, 1998.
McCallum, Rainbow, 6pp., Sep. 30, 1998.
NLTK: The Natural Language Toolkit. Edward Loper and Steven Bird, Proceedings of the ACL Workshop on Effective Tools and Methodologies for Teaching Natural Language Processing and Computational Linguistics, Philadelphia, Association for Computational Linguistics, pp. 62-69. Jul. 2002.
NLTK: The Natural Language Toolkit. Steven Bird and Edward Loper. Proceedings of the ACL demonstration session, Barcelona, Association for Computational Linguistics, pp. 214-217. Jul. 2004.
NLTK-Lite: Efficient Scripting for Natural Language Processing. Steven Bird. Proceedings of the 4th International Conference on Natural Language Processing (ICON). pp. 11-18, Kanpur, India. New Delhi: Allied Publishers. Dec. 2005.
Nallapati et al: "Event threading within news topics" Proceedings of the Thirteenth Acm Conference on Information and Knowledge Management (CIKM), [Online] 2004, pp. 446-453, XP002390646. Retrieved from the Internet: URL:http://www.cs.umass.edu/{nmramesh/p425-nallapati .pdf [retrieved on Jul. 19, 2006].
Soderland, "Learning information extraction rules for semi-structured and free text" Machine Learning Kluwer Academic Publishers Netherlands, [Online] vol. 34, No. 1-3, Feb. 1999 (Feb. 1999), pp. 233-272, XP002391210, ISSN: 0885-6125. Retrieved from the Internet: URL:http://www.springerlink.com/media/f62clcrrlncvnj23recn/contributions/-m/2/3/n/m23118197vg924t51.pdf> [retrieved on Jul. 19, 2006].
Taming the Analytic Data Monster: An Advanced Approach to Data Extraction and Transformation for Enterprise Analytics, pp. 1-12, Genalytics, Inc., 2004.
Technorati.TM., About Technorati, Currently Tracking 31 Million Sites and 2.2 Billion links, 1p., 2006.
www.genalytics.com. Data Sheet, Genalytics Phone, Genalytics Phone: Phone Append our Reverse Look Up to Validate or Target your Prospects, 1 p., Genaytics, Inc. 2005.
www.inxight.com. Inxight SmartDiscovery.TM. The Complete Solution for Enterprise Information Discovery, 2pp., 2005.
www.yahoo.com. Sign In, 1p. Yahoo! Inc., 2006.
Yang et al., "Learning approaches for detecting and tracking news events" IEEE Intelligent Systems, [Online] vol. 14, No. 4, 1999, pp. 32-43, XP002391207. Retrieved from the Internet: URL:http://ieeexplore.ieee.org/ie15/5254/17016/00784083.pdf?tp=&arnumber=-784083&isnumber=17016> [retrieved on Jul. 19, 2006].
Barnum, "Standardizing cyber threat intelligence information with the structured threat information expression (STIX)," Version 1.1; Revision 1, MITRE, Feb. 2014, 22 pages.
"Structured Threat Information expression—STIX—A structured language for cyber threat intelligence information," MITRE, Accessible via https://stix.mitre.org, Jul. 2013, 2 pages.
U.S. Appl. No. 13/975,993, "Identifying and classifying non-functional requirements in text," filed Aug. 26, 2013, 56 pages.
Anonymous: "Characterizing Malware with MAEC and STIX," [Apr. 21, 2014]. Retrieved from: URL:http://stixproject.github.io/

(56) References Cited

OTHER PUBLICATIONS about/Characterizing.sub.--Malware.sub.-- -MAEC.sub.--and.sub.--STIX.sub.-- v1.0.pdf [retrieved on Dec. 7, 2015] 8 pages.
Farnham et al., "Tools and Standards for Cyber Threat Intelligence Projects," SANS Institute InfoSec Ready Room, pp. 2-21 (Oct. 14, 2013).
Extended European Search Report in Application No. 15181386.2, dated Dec. 16, 2015, 10 pages.
U.S. Notice of Allowance for U.S. Appl. No. 14/285,487 dated Jun. 8, 2016, 14 pages.
U.S. Final Office Action for U.S. Appl. No. 14/285,487, dated Mar. 2, 2016, 24 pages.
U.S. Notice of Allowance for U.S. Appl. No. 14/473,730, dated Mar. 1, 2016, 9 pages.
Australian Office Action for Application No. 2016219666, dated Oct. 14, 2016, 6 pages.
European Extended Search Report for Application No. 16186243.8, dated Nov. 15, 2016, 5 pages.
Australian Office Action for Application No. 2016216520, dated Oct. 7, 2016, 4 pages.
Australian Office Action for Application No. 2015113316, dated Mar. 8, 2017, 5 pages.
U.S. Notice of Allowance for U.S. Appl. No. 15/155,328, dated Jan. 13, 2017, 18 pages.
Australian Office Action for Application No. 2016247167, dated Dec. 20, 2016, 6 pages.

\* cited by examiner

SYSTEM AND METHOD FOR DETECTING THE OCCURRENCE OF AN EVENT AND DETERMINING A RESPONSE TO THE EVENT

BACKGROUND

Field

This application generally relates to natural language processing. In particular, this application describes a system and method for detecting the occurrence of an event based on social media content and real-time date feeds, and for recommending a response to deal with the event.

Description of Related Art

First responders such as law enforcement personal, fire fighters, etc. are charged with responding to significant threats/events such as natural catastrophes, protests, riots, killings, etc. First responders are usually notified by a dispatch service when such an event occurs. The dispatch service is in turn notified when a person with knowledge of the event phones the dispatch service.

This process has several problems. First, the time lapse between the initial call from the person to the dispatch service and the dispatch of the first responders can be significant. Second, the process assumes that someone observing the event will actually call the dispatch service.

Some municipalities place surveillance systems in strategic areas of the municipality to help mitigate some of these issues. However, the surveillance systems may not be capable of capturing additional details related to the event. For example, the issue driving a group of protesters to protest may not be discernible by the surveillance system. Thus, it is difficult to ascertain whether the protest is peaceful or is likely to get out of hand.

BRIEF SUMMARY

In one aspect, a system for predicting the occurrence of an event includes an event detector and a reporting processor. The event detector is configured to receive data that defines a plurality of social media items; receive a real-time data feed; and predict the occurrence of an event based on a correlation between information in the social media items and activity associated with the real-time data feed. The reporting processor is configured to determine an event type associated with the event; identify a sentiment of the predicted event based on historical data in the real-time data feed, and to generate a recommendation for preventing the occurrence of the event based on at least one of the event type and the sentiment of the predicted event. The recommendation includes a plurality of actions. The reporting processor is coupled to a knowledge graph database that corresponds to an ontology that defines one or more relationships between event types, and response types. The reporting processor determines an order of the actions of the recommendation based on the knowledge graph ontology.

In a second aspect, a non-transitory computer readable medium includes instruction code that facilitates determining the occurrence of an event. The instruction code is executable by a machine for causing the machine to implement an event detector engine and a reporting engine. The event detector engine receives data that defines a plurality of social media items; receives a real-time data feed; and determines the occurrence of an event based on a correlation between information in the social media items and activity associated with the real-time data feed. The reporting engine determines an event type associated with the event; and generates a recommendation for responding to the event based on the event type.

In a third aspect, a method for determining the occurrence of an event includes receiving, by an event detector, data that defines a plurality of social media items; receiving, by the event detector, a real-time data feed; and determining, by the event detector the occurrence of an event based on a correlation between information in the social media items and activity associated with the real-time data feed. The method also includes determining, by a reporting processor, an event type associated with the event; and generating, by the reporting processor a recommendation for responding to the event based on the event type.

DETAILED DESCRIPTION

The embodiments describe below overcome the problems described in the background by providing a system that is able to retrieve comments posted by users on various social media services, and parse the comments to determine whether the comments are related to some type of significant event. When a potential event is detected, the system selects real-time data feeds that provide real-time information about a location associated with the event. A neural network predicts whether a significant event has occurred based on the comments and the real-time data feeds. The system generates a recommendation for dealing with the event and communicates the recommendation to appropriate first responders.

Figure 1:
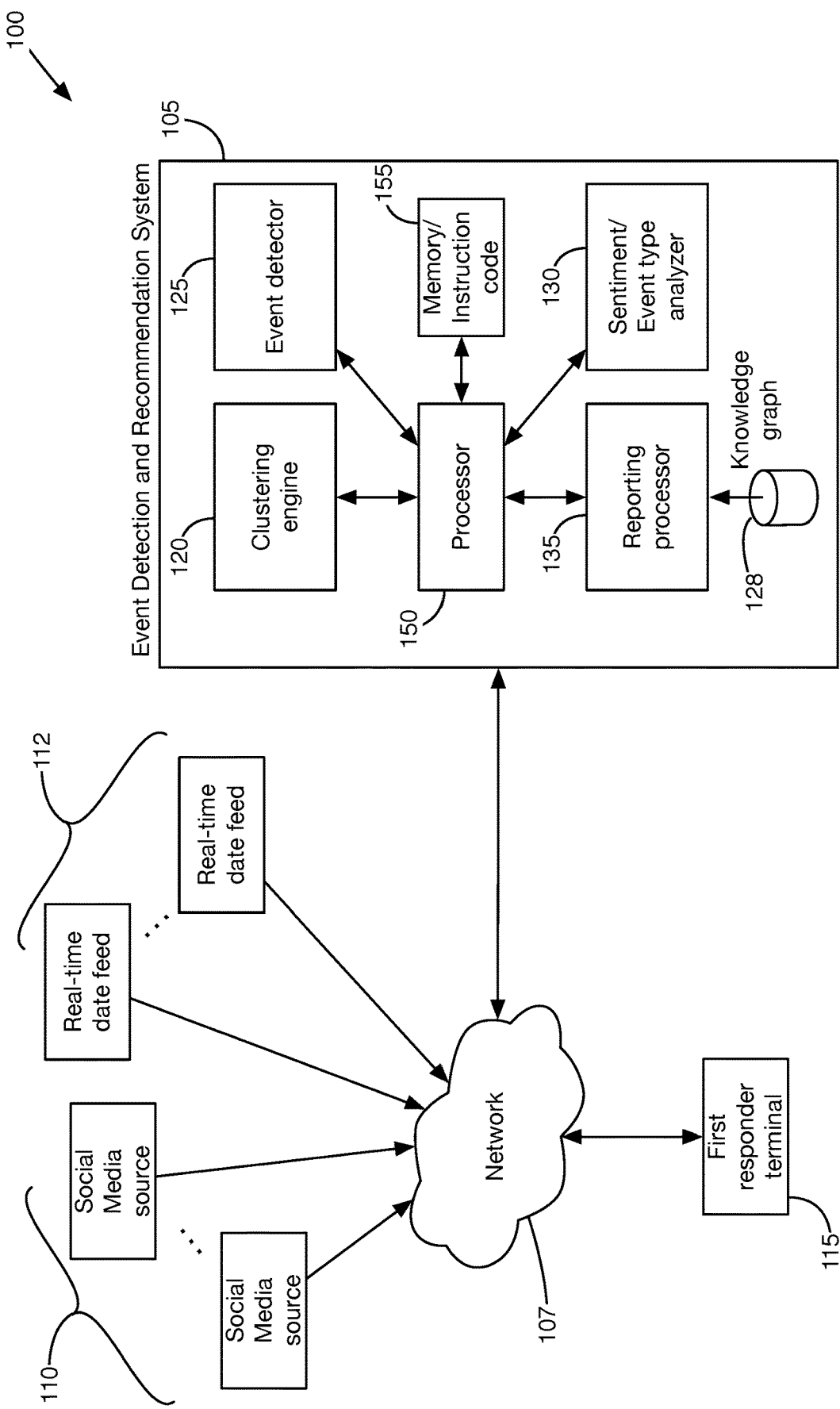
FIG. 1 illustrates an exemplary environment for detecting the occurrence of an event and for generating a recommendation for dealing with the event.

FIG. 1 illustrates an exemplary environment 100 for detecting the occurrence of an event and for generating a recommendation for dealing with the event. Illustrated in the environment 100 are entities that include an event detection and recommendation system (EDRS) 105, a group of social media sources 110, a group of real-time data feeds 112, and a first responder terminal 115. The EDRS 105, social media sources 110, real-time data feeds 112, and first responder terminal 115 may communicate with one another via a network 107, such as the Internet.

The social media sources 110 generally correspond to systems that host social media content. Exemplary social media sources 110 may include Twitter®, Facebook®, Instagram®, etc. Content provided by the social media sources 110 may include public comments posted by users of the social media sources 110, such as a Twitter Tweet. For example, a user may post a comment regarding a protest going on in a city, such the comment illustrated in FIG. 3.

The real-time data feeds 112 generally correspond data streams that originate from closed-circuit television cameras (CCTV), radio stations, news sources, etc. The CCTV's may correspond to cameras placed in various locations within a metropolitan area that facilitate various law enforcement activities. The radio stations may correspond to typical broadcast radio stations that cover a metropolitan area. The radio stations may convey information over the air or via a network by live streaming content. The news sources may correspond to television news sources, web based news source, etc. that stream news content over the air or via a network. Content communicated by the real-time data feeds 112 may be generally contemporaneously generated with the occurrence of an event of some kind, such as a march, riot, protest, etc.

In general, the EDRS 105 receives social media content or items (e.g., tweets, posts, etc.) from the social media sources 110 and analyzes the items using various natural language processing techniques to determine whether the items are related to an event of some significance, such as a protest, riot, killing, etc. If an event of some significance is detected, the EDRS 105 determines a recommendation for dealing with the event and communicates the recommendation to appropriate individuals, agencies, etc., capable of dealing with the event.

The EDRS 105 includes various subsystems that facilitate performance of these operations. The subsystems include a clustering engine 120, an event detector 125, a sentiment analyzer 130, a reporting system 135, and a processor 150 that executes instruction code stored in a memory device 155 for coordinating activities performed between the various subsystems.

It is contemplated that each subsystem may correspond to a stand-alone computer system such as an Intel®, AMD®, or PowerPC® based computer system or a different computer system. The computer systems may include an operating system, such as a Microsoft Windows®, Linux, Unix® or other operating system. It is also contemplated that operations performed on the various subsystems may be combined into a fewer or greater number of subsystems to facilitate speed scaling of the EDRS 105, cost reductions, etc.

Figure 2:
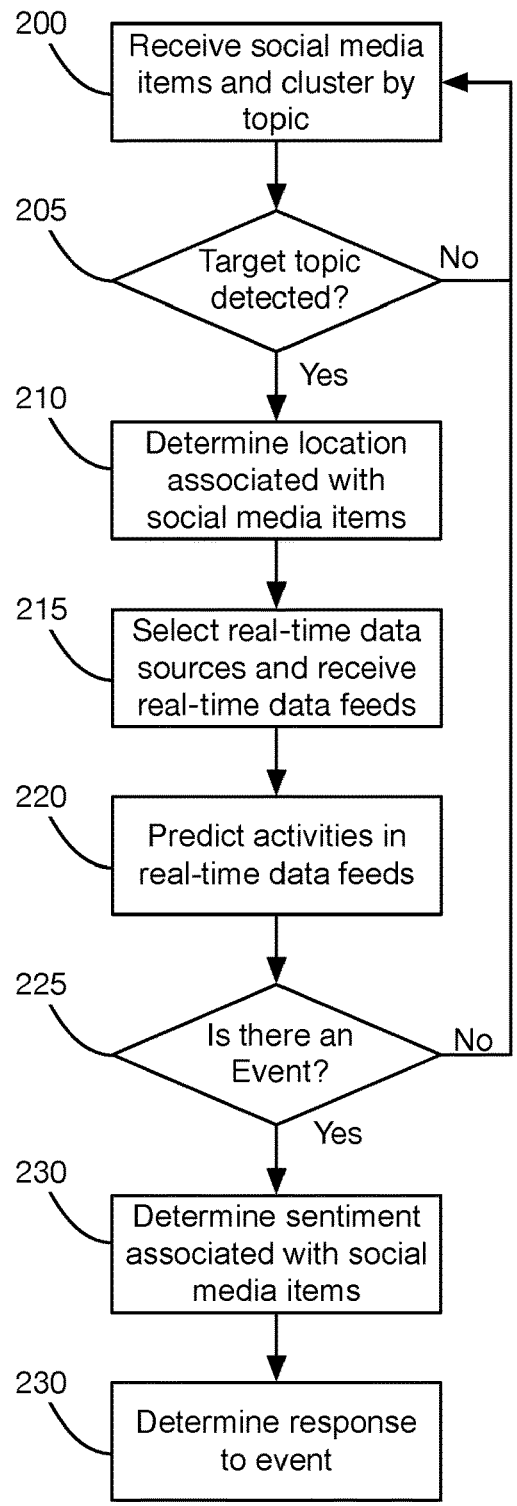
FIG. 2 illustrates operations performed by various entities of the environment.

Operations performed by one or more of the subsystems of the EDRS 105 are illustrated in FIG. 2 and are best understood with reference to FIGS. 3-6. In this regard, the operations may be implemented via instruction code stored in non-transitory computer readable media that resides within the entities configured to cause the respective entities to perform the operations in the figures.

Figure 3:
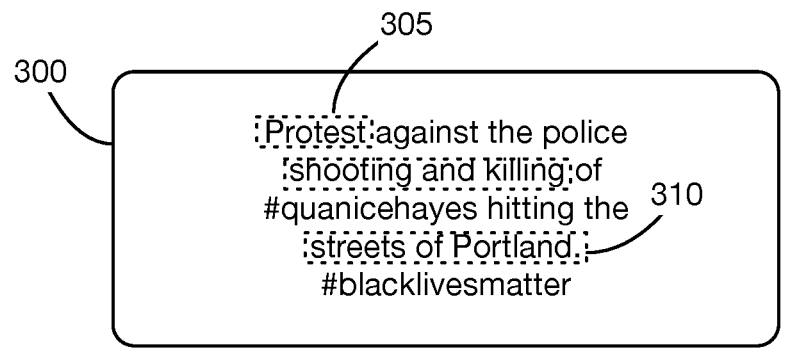
FIG. 3 illustrates an exemplary social media item that corresponds to a comment.

At block 200, the EDRS 105 may receive social media items such as the comment 300 illustrated in FIG. 3 from one of the group of social media sources 110. For example, the EDRS 105 may, via the network 107, monitor websites such as Twitter®, Facebook®, Instagram®, etc. The EDRS 105 may process comments posted by users as they are posted. Alternatively, the EDRS 105 may download any number of comments and process the comments on a less frequent basis.

Figure 4:
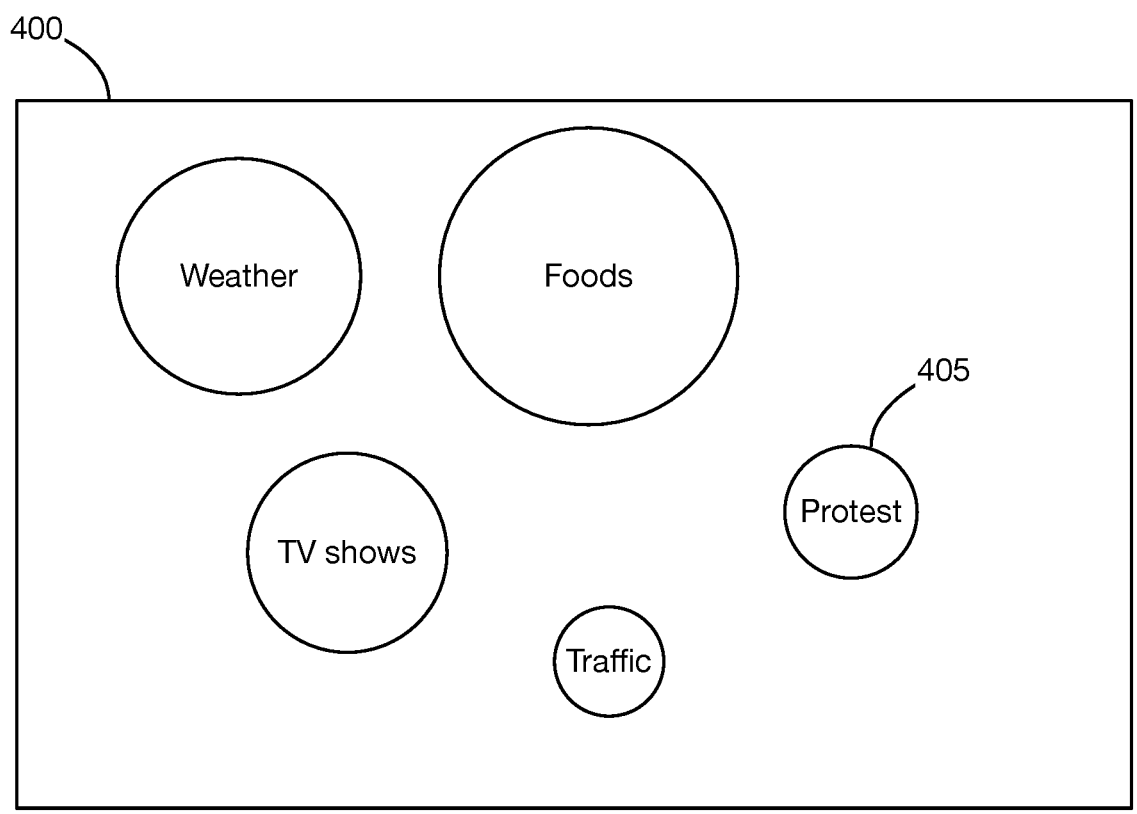
FIG. 4 illustrates clusters of social media items arranged by the topic of the social media items.

The clustering engine 120 is configured to associate each social media item of the plurality of social media items with one of a plurality of topics. For example, as illustrated in FIG. 4, the clustering engine 120 may group different social media items as being related to the topics weather, foods, TV shows, traffic, and protest 405.

The clustering engines 120 may implement one or more similarity-based clustering algorithms to cluster the various social media items. For example, a k-means algorithm may be utilized to represent words in the different social media items as vectors and to compute the distance between the vectors to thereby determine a relatedness between the social media items. Social media items that are clustered together are associated with a topic. The topic may correspond, for example, to one or more nouns in the social media items or terms previously determined to be associated with the one or more nouns.

The clustering engines 120 may evaluate a timestamp associated with the social media items to determine how contemporaneous the social media items are. For example, tweets that are related to the same topic, but that occur days apart may be of little interest. On the other hand, a multitude of tweets arriving within 30 minutes of each other that are related may be indicative of the happening of an event, such as a protest.

The clustering engine 120 may monitor the size of certain target topics that may have previously been determined to be of interest. For example, a target topic 405 associated with protests may have previously been determined to be related to some type of event for which a response of some type is warranted.

At block 205, if the cluster associated with the target topic reaches a predetermined size (i.e., 100 social media items) then at block 210, a geographic location associated with the social media items of the target topic may be determined by a location detector 525 (FIG. 5) of the event detector 125. The location associated with the social media items may be determined by identifying keywords or phrases indicative of a location such as the phrase 310 in social media item 300. For example, the phrase "streets of Portland" may be taken to mean Portland Oreg. or a place named Portland elsewhere. By analyzing a number of social media items a more precise estimate of the geographic location may be determined.

Figure 5:
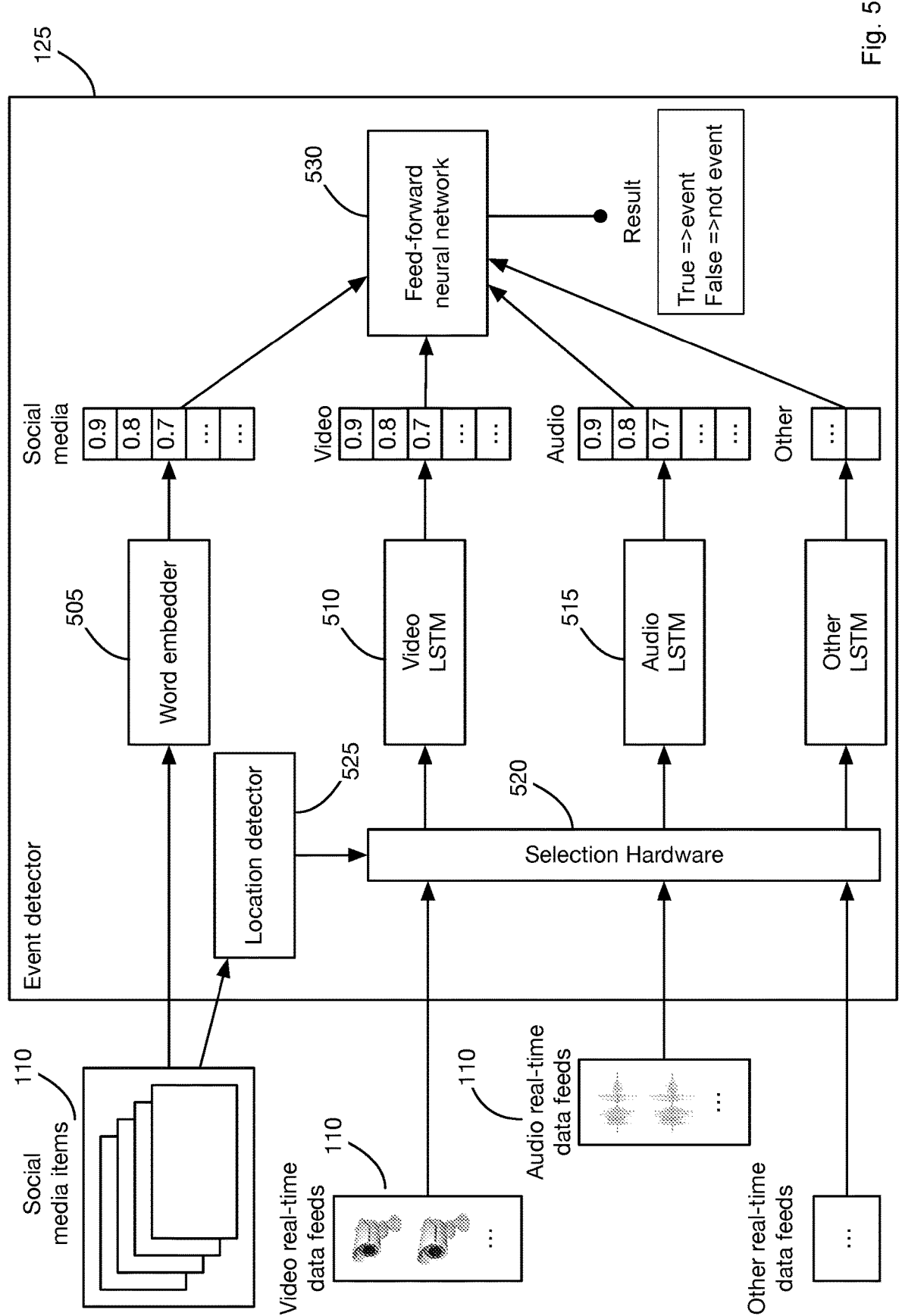
FIG. 5 illustrates exemplary details of an event detector of the system.

At block 215, real-time data sources associated with the determined location may be selected and real-time data streams from the selected data sources may be analyzed. For example, as illustrated in FIG. 5, selection hardware 520 of the event detector 125 may select video real-time data-feeds 110, audio real-time data feeds, and/or other real-time data-feeds from sources previously determined to by associated with a particular geographic location.

At block 220, activities associated with the real-time data feeds may be predicted. In this regard, the event detector 125 may include one or more recurrent neural network (RNN) such as a long/short-term memory (LSTM) RNN to make predictions regarding activities occurring in the real-time data feeds. For example, a video LSTM 510 may receive as input a number of video frames defined in the video real-time data feed. Each frame may be converted into a vector representation that facilitates processing by the video LSTM 510. The video LSTM 510 may have been previously trained to make certain predictions based on the content of the video frames. For example, the weights of the neural nodes of the video LSTM 510 may have been adjusted/trained so that input content that includes an excessive amount of motion results in an output indicative of a high degree of activity. Such activity may be found in videos that display a large protest or a number of people running around. The output of the video LSTM 510 may be expressed as vector with features corresponding to different types of activities. The activity associated with the feature with the highest values may be taken to be the predicted activity.

An audio LSTM 515 may be similarly configured to generate an output vector of predicted activities based upon a vector representation of the audio real-time data feed 110. Other LSTMs may be configured to provided predicted activities based corresponding real-time data feeds. In cases where multiple video, multiple audio, or multiple other real-time data feeds are to be analyzed, a corresponding number of LSTMs may be provided to analyze each datafeed.

The outputs vectors of the various LSTMs 501, 515, etc. may be provided as input into a feed-forward neural network 530 along with a vector version of the social media items that belong to the target topic. The social media items may be converted into vectors by a word embedder 505 that maps words or phrases in the social media items to vectors of real numbers. For example, the word embedder 505 may implement functionality similar to that of Word2vec.

The feed-forward neural network 530 is trained to output a result indicative of whether an event (i.e., substantial event) has occurred based on the various input sources.

If at block 225, the feed-forward neural network 530 determines that an event for which a response is required has occurred, then at block 230, the sentiment/event type analyzer 130 of the EDRS 105 may determine the sentiment associated with the social media items of the target topic. In this regard, the sentiment analyzer 130 may perform distributional compositional semantics and hierarchical language modeling operations in assessing the sentiment associated with each social media item of the target topic. The sentiments associated with all the social media items of the target topic may be averaged to find an average sentiment for the target topic.

In a similar manner, the sentiment/event type analyzer 130 may perform distributional compositional semantics and hierarchical language modeling operations in assessing the event type associated with each social media item. For example, whether the event type is a protest, riot, killing, etc. The event types associated with all the social media items of the target topic may be determined and the event type that appears most often in the social media items may be determined to be the event type associated with the target topic.

At block 230, an appropriate response for responding to the event associated with the target topic may be determined by the reporting processor 135. In this regard, the reporting processor 135 may be coupled to a knowledge graph database 128.

Figure 6:
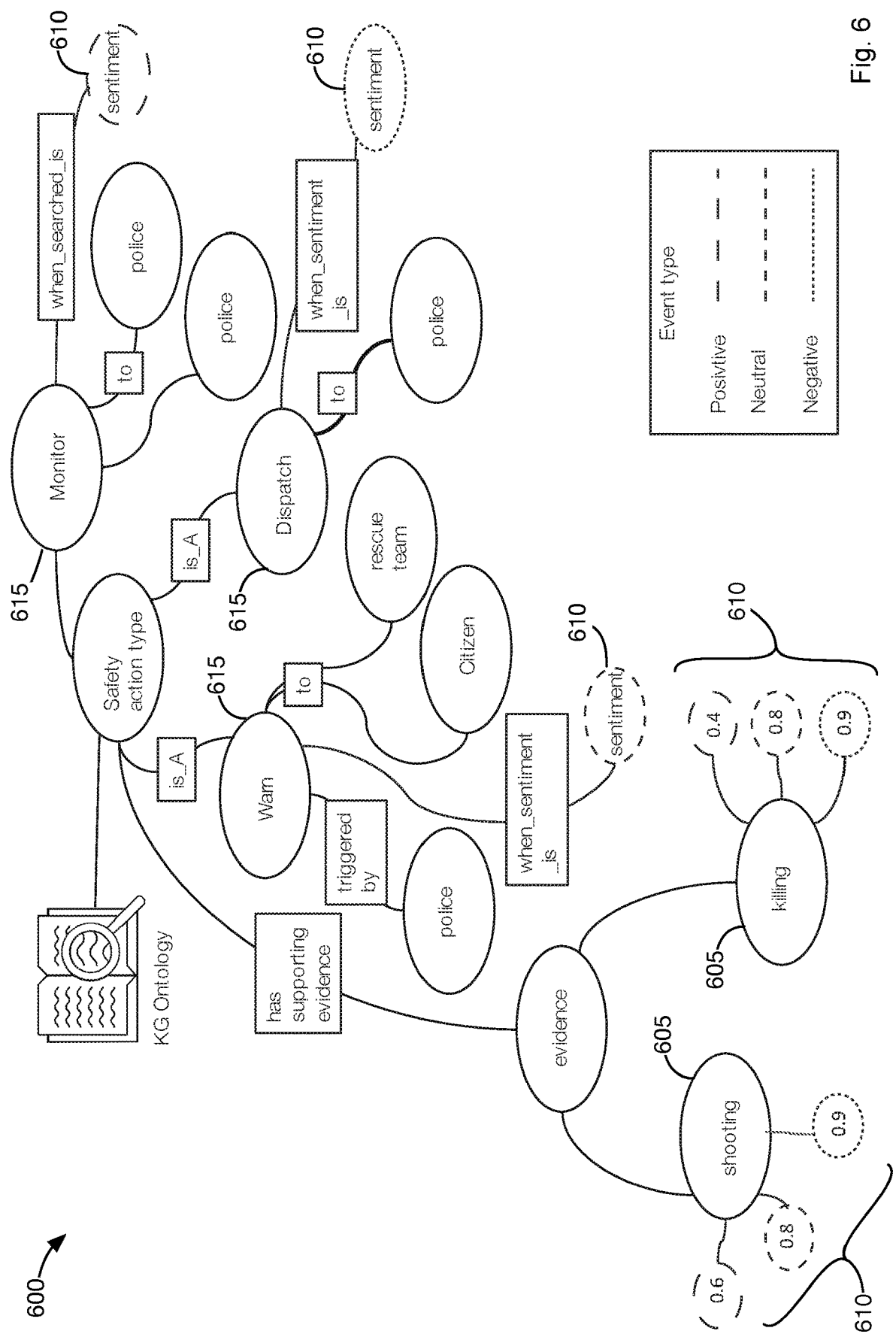
FIG. 6 illustrates an exemplary knowledge graph that corresponds to an ontology that defines relationships between event types, sentiment types, and response types.

Referring to FIG. 6, the knowledge graph 600 corresponds to an ontology that defines relationships between event types 605 (e.g., shooting, killing), sentiment types 610 (e.g., positive, neutral, negative), and response types 615 (e.g., warn, monitor, dispatch).

The reporting processor 135 is configured to locate in the knowledge graph 600 a response type associated with the determined sentiment and the event type and generate a recommendation based on the located response type. The response type is selected from the graph by identifying the response type which matches the optimal sentiment and topic associated with the event. This may be expressed by the following expression:

$Max_{w_i,i}(A)$, where A is the response type and $$w_i = \frac{\sum \text{evidence, sentiment}}{2}$$

For example, if the determined event type is a shooting and the corresponding sentiment type is negative, then according to the ontology, the recommendation may be "dispatch police." If the determined event type is a shooting and the corresponding sentiment type is neutral, then according to the ontology, the recommendation may be "warn police of possible shooting."

After generation of the recommendation, the reporting processor 135 may communicate the recommendation of a group of best recommendations to the first responder terminal 115.

Figure 7:
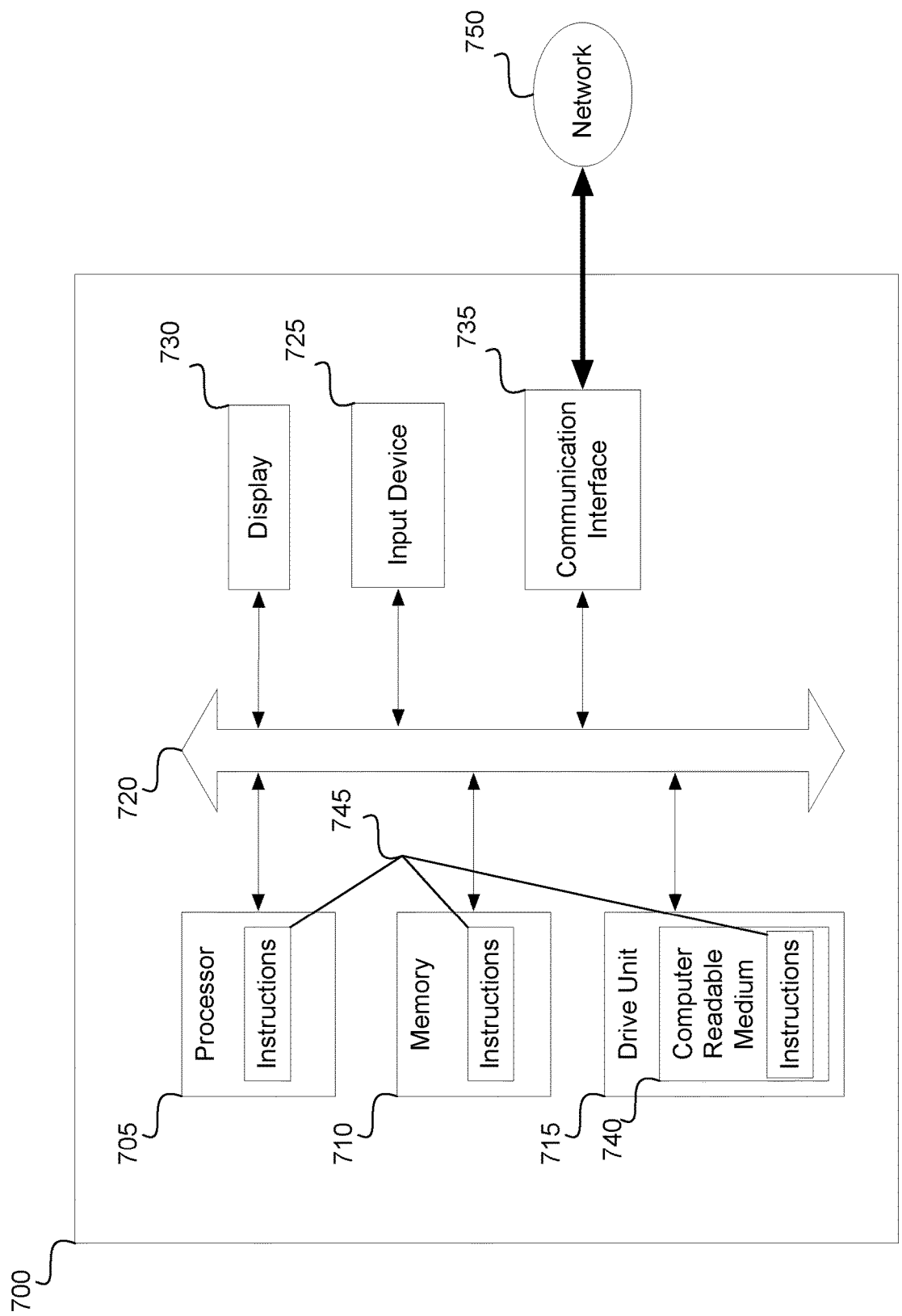
FIG. 7 illustrates an exemplary computer system that may form part of or implement the systems described in the figures or in the following paragraphs.

FIG. 7 illustrates a computer system 700 that may form part of or implement the systems described above. The computer system 700 may include a set of instructions 745 that the processor 705 may execute to cause the computer system 700 to perform any of the operations described above. The computer system 700 may operate as a stand-alone device or may be connected, e.g., using a network, to other computer systems or peripheral devices.

In a networked deployment, the computer system 700 may operate in the capacity of a server or as a client-user computer in a server-client user network environment, or as a peer computer system in a peer-to-peer (or distributed) network environment. The computer system 700 may also be implemented as or incorporated into various devices, such as a personal computer or a mobile device, capable of executing the instructions 745 (sequential or otherwise) that specify actions to be taken by that machine. Further, each of the systems described may include any collection of subsystems that individually or jointly execute a set, or multiple sets, of instructions to perform one or more computer functions.

The computer system 700 may include one or more memory devices 710 on a bus 720 for communicating information. In addition, code operable to cause the computer system to perform any of the operations described above may be stored in the memory 710. The memory 710 may be a random-access memory, read-only memory, programmable memory, hard disk drive or any other type of memory or storage device.

The computer system 700 may include a display 730, such as a liquid crystal display (LCD), a cathode ray tube (CRT), or any other display suitable for conveying information. The display 730 may act as an interface for the user to see the functioning of the processor 705, or specifically as an interface with the software stored in the memory 710 or in the drive unit 715.

Additionally, the computer system 700 may include an input device 725, such as a keyboard or mouse, configured to allow a user to interact with any of the components of system 700.

The computer system 700 may also include a disk or optical drive unit 715. The disk drive unit 715 may include a computer-readable medium 740 in which the instructions 745 may be stored. The instructions 745 may reside completely, or at least partially, within the memory 710 and/or within the processor 705 during execution by the computer system 700. The memory 710 and the processor 705 also may include computer-readable media as discussed above.

The computer system 700 may include a communication interface 735 to support communications via a network 750. The network 750 may include wired networks, wireless networks, or combinations thereof. The communication interface 735 network may enable communications via any number of communication standards, such as 802.11, 802.12, 802.20, WiMAX, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made and equivalents may be substituted without departing from the scope of the claims. Therefore, it is intended that the present methods and systems not be limited to the particular embodiment disclosed, but that the disclosed methods and systems include all embodiments falling within the scope of the appended claims.

We claim:

1. A system comprising:
  non-transitory memory storing instructions executable to predict an occurrence of an event; and
  a processor configured to execute the instructions to:
    receive data that defines a plurality of social media items;
    in response to receiving the data, categorize each social media item of the plurality of social media items into each topic of a plurality of topics;
    in response to categorizing the each social media item into the each topic, determine whether a plurality of social media items have been categorized to a target topic within a predetermined amount of time according to evaluating time stamps of the social media items, and select the target topic when a predetermined number of social media items have been posted to the target topic;
    in response to selecting the target topic, determine a geographic location associated with the predetermined number of social media items included in the target topic;
    in response to determining the geographic location, select and receive a real- time data feed associated with the determined geographic location;
    in response to receiving the selected real-time data feed, analyze the selected real-time data feed to determine the occurrence of an activity associated with the real-time data feed, and predict the occurrence of the event based on a correlation between information in the plurality of social media items and the activity associated with the real-time data feed;
    in response to predicting the occurrence of the event, determine an event type associated with the event by assessing the event type associated with each social media item of the plurality of social media items using distributional compositional semantics and hierarchical language modeling;
    in response to determining the event type, identify a sentiment of the event by calculating a sentiment value that is an average value of a plurality of sentiments associated with all of the plurality of social media items;
    determine a response type based on the identified sentiment of the event and supporting evidence of the determined event type; and
    transmit a message associated with the determined response type to a first responder terminal.

2. The system according to claim 1, wherein the processor is configured to:
  generate vector representations of each word in each of the social media items of the target topic;
  generate by a long-short term (LSTM) neural network a vector representation of predicted activities associated with the real-time data feed; and
  generate by a feed forward neural network an output indicative of whether the social media items are associated with an event based on the vector representations of each word in each of the social media items of the target topic and the vector representation of predicted activities.

3. The system according to claim 2, wherein the processor is further configured to query a knowledge graph database that defines one or more relationships between event types, sentiment types, and response types, and wherein the processor is further configured to locate in the knowledge graph the response type associated with the determined sentiment and the event type and generates the recommendation based on the located response type.

4. The system according to claim 1, wherein the processor is further configured to aggregate the social media items associated with the target topic and to determine a sentiment associated with the aggregate.

5. The system according to claim 1, wherein the processor is configured to determine the event type based on keywords in the social media items associated with the target topic.

6. The system according to claim 1, wherein the real-time data feed corresponds to one or more of: a video data feed, an audio data feed, a news data feed, a weather data feed, and historical event data feed.

7. A non-transitory computer readable medium that includes instruction code that facilitates determining the occurrence of an event, the instruction code being executable by a machine for causing the machine to perform acts comprising:
  implementing an event detector engine configured to:
    receive data that defines a plurality of social media items;
    determine a geographic location associated with a predetermined number of social media items included in a target topic;
    in response to determining the geographic location, select and receive a real-time data feed associated with the determined geographic location; and
    in response to receiving the selected real-time data feed, analyze the selected real-time data feed to determine the occurrence of an activity associated with the real-time data feed, and determine the occurrence of the event based on a correlation between information in the plurality of social media items and the activity associated with the real-time data feed;
  implementing a reporting engine configured to:
    determine an event type associated with the event by assessing the event type associated with each social media item of the plurality of social media items using distributional compositional semantics and hierarchical language modeling;

in response to determining the event type, identify a sentiment of the event by calculating a sentiment value that is an average value of a plurality of sentiments associated with the plurality of social media items, and determine a response type based on the identified sentiment of the event and supporting evidence of the determined event type; and transmit a message associated with the determined response type to a first responder terminal; and implementing a clustering engine configured to:

categorize the each social media item into each topic of a plurality of topics; and in response to categorizing the each social media item into the each topic, determine whether a plurality of social media items have been categorized to a target topic within a predetermined amount of time according to evaluating time stamps of the social media items, and select the target topic when a predetermined number of social media items that have been posted to the target topic.

8. The non-transitory computer readable medium according to claim 7, wherein the instruction code is executable by the machine for causing the machine to further implement:

word embedding logic configured to generate vector representations of each word in each of the social media items of the target topic;

a long-short term (LSTM) neural network configured generate a vector representation of predicted activities associated with the real-time data feed; and a feed forward neural network configured to generate an output indicative of whether the social media items are associated with an event based on the vector representations of each word in each of the social media items of the target topic and the vector representation of predicted activities.

9. The non-transitory computer readable medium according to claim 8, wherein the reporting engine is coupled to a knowledge graph database that defines one or more relationships between event types, sentiment types, and response types, and wherein the implementation of the reporting engine is configured to locate in the knowledge graph the response type associated with the determined sentiment and the event type and generates the recommendation based on the located response type.

10. The non-transitory computer readable medium according to claim 7, wherein the instruction code is executable by the machine for causing the machine to implement a sentiment analyzer configured to aggregate the social media items associated with the target topic and to determine a sentiment associated with the aggregate.

11. The non-transitory computer readable medium according to claim 7, wherein the real-time data feed corresponds to one or more of: a video data feed, an audio data feed, a news data feed, a weather data feed, and historical event data feed.

12. A method for determining an occurrence of an event, the method comprising:

receiving, by an event detector, data that defines a plurality of social media items;

in response to receiving the data, categorizing, by a clustering engine, each social media item of the plurality of social media items into each topic of a plurality of topics;

in response to categorizing the each social media item into the each topic, determining, by the clustering engine, whether a plurality of social media items have been categorized to a target topic within a predetermined amount of time according to evaluating time stamps of the social media items, and selecting the target topic when a predetermined number of social media items have been posted within a predetermined amount of time to the target topic having the predetermined number of social media items that have been posted within the predetermined amount of time;

in response to selecting the target topic, determining, by the event detector, a geographic location associated with the predetermined number of social media items included in the target topic;

in response to determining the geographic location, selecting and receiving, by the event detector, a real-time data feed associated with the determined geographic location;

in response to receiving the selected real-time data feed, analyzing the selected real-time data feed to determine the occurrence of an activity associated with the real-time data feed, and determining, by the event detector, the occurrence of the event based on a correlation between information in the plurality of social media items and the activity associated with the real-time data feed;

in response to determining the occurrence of the event, determining, by a reporting processor, an event type associated with the event by assessing the event type associated with each social media item of the plurality of social media items using distributional compositional semantics and hierarchical language modeling;

in response to determining the event type, identifying, by the reporting processor, a sentiment of the event by calculating a sentiment value that is an average value of a plurality of sentiments associated with the plurality of social media items, and determining a response type based on the identified sentiment of the event and supporting evidence of the determined event type; and transmit a message associated with the determined response type to a first responder terminal.

13. The method according to claim 12, further comprising:

generating, by word embedding logic, vector representations of each word in each of the social media items of the target topic;

generating, by a long-short term (LSTM) neural network, a vector representation of predicted activities associated with the real-time data feed; and generating, by a feed forward neural network, an output indicative of whether the social media items are associated with an event based on the vector representations of each word in each of the social media items of the target topic and the vector representation of predicted activities.

14. The method according to claim 13, wherein the reporting processor is coupled to a knowledge graph database that defines one or more relationships between event types, sentiment types, and response types, and wherein the reporting processor locates in the knowledge graph the response type associated with the determined sentiment and the event type and generates the recommendation based on the located response type.

15. The method according to claim 12, further comprising aggregating, by a sentiment analyzer, the social media items associated with the target topic and determining a sentiment associated with the aggregate.

16. The method according to claim 12, wherein the real-time data feed corresponds to one or more of: a video data feed, an audio data feed, a news data feed, a weather data feed, and historical event data feed.

\* \* \* \* \*